United States Patent [19]

Mitchell et al.

[11] 4,390,809
[45] Jun. 28, 1983

[54] BRACKET SUPPORT MEANS FOR A CATHODE RAY TUBE

[75] Inventors: Robert B. Mitchell, Seneca Falls; Harry R. Swank, Liverpool, both of N.Y.

[73] Assignee: North American Philips Consumer Electronics Corp., New York, N.Y.

[21] Appl. No.: 207,328

[22] Filed: Nov. 17, 1980

[51] Int. Cl.$^3$ .................... H04N 5/65; H01J 29/87
[52] U.S. Cl. .................................. 313/482; 358/246
[58] Field of Search ................. 313/482; 358/246, 247

[56] References Cited

U.S. PATENT DOCUMENTS 3,271,516  9/1966  Damm ................................. 358/246
4,210,935  7/1980  Mitchell et al. ..................... 358/246
4,342,049  7/1982  Dickinson .......................... 358/246

Primary Examiner—Palmer C. Demeo
Attorney, Agent, or Firm—Thomas A. Briody; Jack Oisher; John C. Fox

[57] ABSTRACT

The invention relates to a three-portion CRT mounting bracket of the type employed for supporting a banded tube in a display environment. An apertured mounting appendage is located spatially above a seating portion by means of an intermediate protruding portion. By this integral arrangement, the mounting appendage is oriented rearward of the front edge of the banding strap. This permits the strap to advantageously overlay the mold line of the panel, while the appendage is suitably positioned in a plane thereabove to fulfill the respective tube mounting requirements.

4 Claims, 5 Drawing Figures

BRACKET SUPPORT MEANS FOR A CATHODE RAY TUBE

TECHNICAL FIELD

This invention relates to means for supporting a cathode ray tube (CRT) in an operational orientation and more particularly to a tube supportive arrangement wherein the ear-like mounting appendages of the supporting bracket means are positioned above the surface of the tensioned tube-encompassing banding in an implosion resistant system.

BACKGROUND OF THE INVENTION

Cathode ray tubes, of the types conventionally employed in television and allied display applications, often utilize tube support systems associated with implosion-resistant means in the form of a tensioned metallic banding encompassment of the forward region of the tube envelope adjacent the viewing area. Banded tubes of this construction often utilize a plurality of spaced-apart substantially L-shaped supporting brackets having a seating portion and an integrally related upstanding apertured ear-like appendage. Such tube-supporting brackets are usually affixed in a compressed sandwiched manner between the surface of the tube envelope and a superjacent metallic banding tightly tensioned thereover to provide the intended implosion-inhibiting characteristics for the tube.

In the fabrication of the viewing panel portion of the tube envelope, a mold match line is evidenced peripherally encircling the envelope adjacent to the beginning of the curvature of the closure portion constituting the viewing panel. To promote optimum implosion resistance, it has been found advantageous to orient the tensioned banding in a manner to overlay the mold line.

Being positionally affixed by the tensioned banding, the appendage portions of the L-shaped supporting brackets extend outward in a substantially normal fashion from the edge of the banding strap. Usually four such brackets are employed, and on rectangular type tubes, are conventionally positioned at substantially the corner regions of the panel portion. As such, the respective apertures therein are oriented to mate with suitable predetermined mounting surfaces and means, such as studs, bolts or screws; such being located on the inside of a display cabinet or similar setting having an opening therein to accommodate the tube viewing panel. This display opening is usually of an area slightly smaller than the surface area of the panel, since the internal screen display area of the tube is smaller than the exterior surface of the panel. It is common practice to frame this display opening with a decorative bezel to enhance the aesthetic appearance of the viewed display.

Manufacturers of display equipment, television sets and the like, usually stipulate the tube panel area to be viewed. As such, the boundary of the framing area is designated as the "Z point" region, and the distance from the "Z point" to the respective front planes of the bracket appendages is specified to facilitate desired mounting placement of the tube. In view of the variety of tube sizes and mounting arrangements, matching difficulties have been encountered due to differing "Z point"-to-appendage dimensions. The usual L-shaped mounting brackets, being located with the appendage against the edge of the banding strap, allow for only limited shifting of the banding, during tube fabrication, and still have it in desired overlay relationship with the mold line. Thus, some tube types, employing the conventional L-shaped brackets, are not readily adaptable to adequately meet certain mounting applications wherein the "Z point"-to-bracket dimensions do not match the required mounting conditions.

DISCLOSURE OF THE INVENTION

It is therefore an object of the invention to reduce and obviate the aforementioned disadvantages evidenced in the prior art. Another object of the invention is the provision of a CRT bracket support means, that being affixed by the banding, permits the tensioned banding to overlay the panel mold line while the appendage portion of the bracket is oriented in an outstanding position above the banding.

These and other objects and advantages are accomplished in one aspect of the invention by providing a CRT mounting bracket means that is formed from a longitudinal piece of substantially rigid material wherein first and second spatially-related transverse bends are made to provide integral seating, protruding and appendage portions. The seating portion, which evidences an arcuate shaping to substantially conform to a discrete surface of the tube envelope, being held thereagainst by the banding strap, is formed at the forward end of the bracket material. The aft region of the seating portion is demarcated by the first transverse bend which defines a U-shaped reverse curvature of the bracket material. Extending forwardly from the first transverse bend, and in substantially parallel relationship with the seating portion, is an integral protruding portion, which is of shorter length than the seating portion. The fore-region of this portion is terminated by the second transverse bend, from which an integral ear-like appendage portion is upstanding in a substantially normal manner. The appendage, being in a plane substantially parallel with and normal to the subsequent banding orientation, has an aperture therethrough to facilitate subsequent attachement to appropriate tube supportive and positioning means. Since the protruding portion has a length shorter than that of the seating portion, the mounting appendage is positioned over and above the banding, rearward of the forward edge thereof. This feature of the invention enables the tensioned banding strap to be optimally located in overlay relationship with the mold line and still meet certain "Z point"-to-appendage mounting requirements that are not limited by the forward edge of the banding strap.

BRIEF DESCRIPTION OF THE DRAWINGS

FIG. 3b is a frontal view of the bracket taken along the line 3b—3b in 3a; and

BEST MODE FOR CARRYING OUT THE INVENTION

For a better understanding of the present invention together with other and further objects, advantages and capabilities thereof, reference is made to the following disclosure and appended claims taken in conjunction with the aforedescribed drawings.

While the invention is illustrated as being formed for utilization with a CRT of substantially rectangular shaping, the teachings of the disclosure are intended to be equally applicable to usage with other envelope forms, such as round or ovate shapings.

Figure 1:
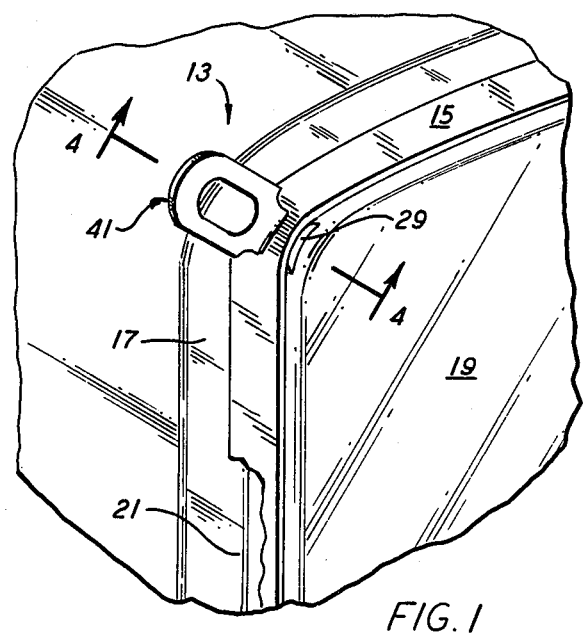
FIG. 1 is a partial perspective of the forward portion of a cathode ray tube illustrating utilization of the invention as finally positioned and securely affixed beneath the tensioned banding encompassing the tube.
Figure 4:
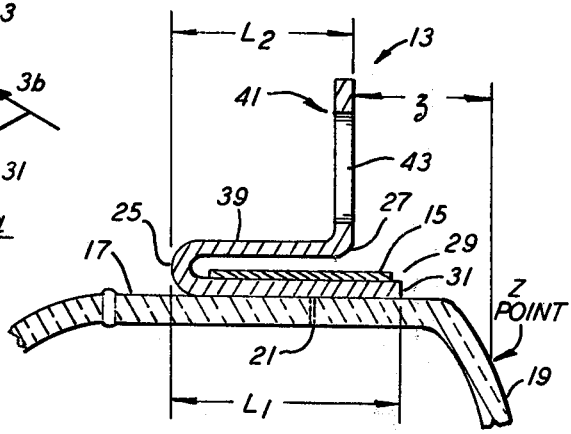
FIG. 4 is a longitudinal sectional of the mounting bracket as utilized on a banded CRT, the view being taken along the line 4—4 in FIG. 1.

With reference to the drawings, there is shown in FIG. 1 a partial frontal perspective of the forward portion of a cathode ray tube 11 as viewed from the front. One of the spaced-apart plurality of tube mounting brackets 13, for supporting the tube in a display orientation, is shown positioned in conjunction with a tensioned implosion-inhibiting banding strap 15. This banding is peripherally located as a tensioned encompassment of the forward region of the tube envelope, encircling a side-related region of the panel portion 17 adjacent the viewing area 19 thereof. To promote safety, as previously mentioned, it has been found to be advantageous for the tensioned banding to overlay the mold-match line of the panel 21, such as illustrated in FIGS. 1 and 4.

Figure 2:
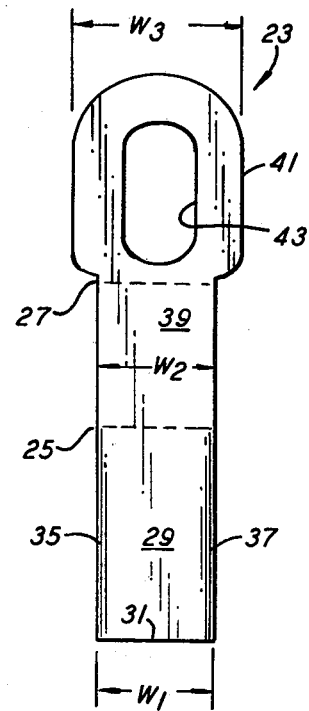
FIG. 2 is a plan view of the bracket blank before forming.
Figure 3A:
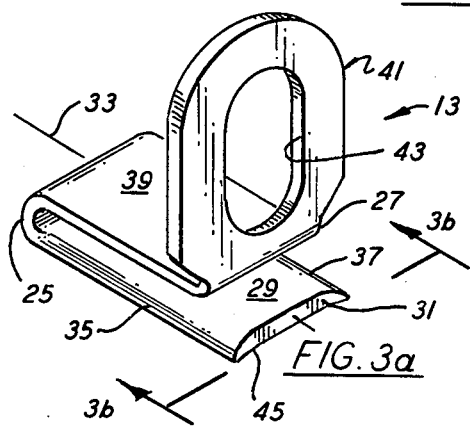
FIG. 3a is a perspective of the tube mounting bracket.
Figure 3B:
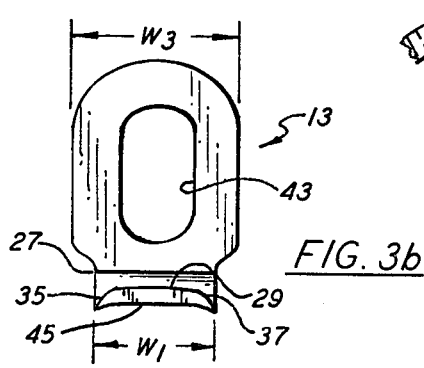

The invention is addressed to the CRT bracket mounting means 13 which is formed, as shown in FIG. 2, from a longitudinal blank 23 of substantially rigid material, such as metal. First and second spatially-related transverse bends 25 and 27 are made in the blank 23 to produce the bracket means 13, which is comprised of the integral portions.

In greater detail, a seating portion 29 is formed from the bracket blank, being defined between the forward region 31 and the aft region denoted by the first transverse bend 25. It evidences length ($L_1$) and width ($W_2$) dimensions, and has a longitudinal axis 33 therethrough. This portion 29 is of substantially arcuate shaping across the width ($W_1$) dimension, such extends longitudinally therein to substantially conform to discrete perimetrical surface regions of the tube envelope, as shown in the drawings. The longitudinal edges 35 and 37 associated with the upper surface of the seating portion are beveled to facilitate enhanced contiguity with the banding strap 15 tensioned thereover. The aft region demarcated by the first transverse bend 25 is configured as a U-shaped substantially 180° reverse curvature of the bracket material.

Extending forward from the reverse curvature is a second or protruding portion 39 which is in spatial and substantially parallel relationship with the seating portion 29. This second portion has a length ($L_2$), a width ($W_2$) and a fore-region terminated by the second transverse bend 27.

An integral ear-like appendage portion 41 is formed as an upstanding member in a substantially normal manner from the protruding portion 39 resultant of the second transverse bend 27. The appendage has an aperture 43 therethrough to facilitate subsequent attachment of the bracket to appropriate tube supportive and positioning means associated with tube operational orientation. Positionally, the upstanding appendage portion 41 is in a plane substantially parallel with and normal to the longitudinal lay of the banding strap 15 orientation, such being illustrated in FIGS. 1 and 4. The second transverse bend 27 from which the mounting appendage is formed, is rearward from the forward end 31 of the seating portion 29, since the length ($L_2$) of th protruding portion 39 is less than the length ($L_1$) of the seating portion 29, as shown. With particular reference to FIG. 4, this orientation of the appendage 41 over the seating portion 29, rearward of the front edge of the banding, allows brackets to be advantageously formed to accommodate differing "Z point"-to-appendage distances "z". In each instance, the banding strap is optimally positioned to overlay the mold line in the panel.

As shown in the drawings, the width ($W_1$) of the seating portion 29 is less than the width ($W_3$) of the mounting appendage. This dimensional consideration permits a relatively short arcuate formation 45 of the seating portion, which facilitates seating placement on a panel perimeter that may evidence slightly different curvature.

By having the width ($W_2$) of the protruding portion 39 substantially equalling the width ($W_1$) of the seating portion 29, there is provided a structure of adequate strength and rigidity and one that is economical in the use of material.

INDUSTRIAL APPLICABILITY

The aforedescribed CRT mounting bracket marks an advancement in the multiple-bracket system utilized for supporting a banded tube in a display environment. The versatility that is incorporated into the formation of the three-portioned bracket, facilitates advantageous placement of the mounting appendage portion over and above the seating portion. This relationship permits brackets to be formed wherein the ($L_2$) dimension of the protruding portion 39 is varied to meet certain "Z point" mounting distance requirements, while allowing the banding strap 15 to beneficially remain in overlay relationship upon the panel mold line 21. Such design versatility is not possible with the conventional L-shaped CRT mounting brackets normally employed for banded tube support and positioning.

Use of the bracket of the invention enhances tube quality by insuring consistent coverage of the panel mold line, along with an adequate fulfillment of tube positioning requirements.

What is claimed is:

1. Cathode ray tube bracket mounting means of the type employed in a multiple spaced-apart bracket tube-support system associated with implosion-inhibiting banding means oriented as a tensioned encompassment of the forward region of the tube adjacent the viewing area thereof, each of said brackets being formed from a longitudinal piece of substantially rigid material having first and second spatially-related transverse bends therein to provide predetermined integral bracket portions comprising: a seating portion having a longitudinal axis and evidencing length and width dimensions defined between longitudinal edges and a forward and an aft region thereof, said seating portion being of substantially arcuate shaping across said width dimension and extending longitudinally therein to substantially conform to discrete perimetrical surface regions of said tube to facilitate subsequent substantially contiguous placement of said seating portion between said banding means and the selected surface of said tube, said aft region being demarcated by said first transverse bend defining a U-shaped reverse curvature of said bracket material; an integral protruding portion extending forwardly from said first transverse bend in substantially spatial parallel relationship with said seating portion and having a fore-region terminated by said second transverse bend in said bracket material, said second transverse bend being rearward of the forward end of said seating portion; and an integral ear-like appendage portion upstanding in a substantially normal manner from said protruding portion at said second transverse bend, said appendage being in a plane substantially parallel with and normal to said subsequent banding orientation and having an aperture therethrough to facilitate subsequent attachment to appropriate tube supportive and positioning means associated with operational orientation.

2. The cathode ray tube bracket mounting means according to claim 1 wherein the width of said seating portion is less than the width of said appendage portion.

3. The cathode ray tube bracket mounting means according to claim 2 wherein the width of said protruding portion substantially equals that of said seating portion.

4. The cathode ray tube bracket mounting means according to claim 1 wherein the longitudinal edges associated with the upper surface of said seating portion are beveled to facilitate enhanced contiguity with said banding subsequently tensioned thereover.

* * * * *